(No Model.)
L. H. McMAHON.
FISHING LINE ATTACHMENT.
No. 578,762. Patented Mar. 16, 1897.
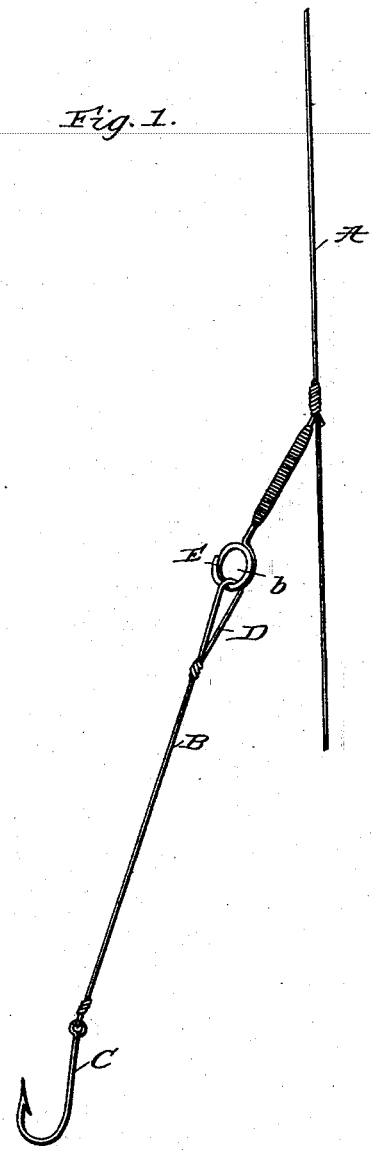
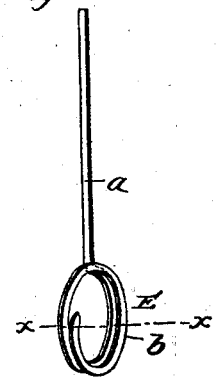
Witnesses:
C. H. Raeder
H. A. James
Inventor
L. H. McMahon
By James J. Sheehy
Attorney

UNITED STATES PATENT OFFICE.

LEONARD HARLE McMAHON, OF SALEM, OREGON.

FISHING-LINE ATTACHMENT.

SPECIFICATION forming part of Letters Patent No. 578,762, dated March 16, 1897.

Application filed August 28, 1896. Serial No. 604,232. (No model.)

*To all whom it may concern:*

Be it known that I, LEONARD HARLE MCMA-HON, a citizen of the United States, residing at Salem, in the county of Marion and State of Oregon, have invented certain new and useful Improvements in Fishing-Tackle; and I do declare the following to be a full, clear, and exact description of the invention, such as will enable others skilled in the art to which it appertains to make and use the same.

My invention relates to improvements in fishing-tackle, and more particularly to means for connecting the snoods or snells of hooks to leaders and lines; and it has for its general object to provide a cheap and simple device, through the medium of which a snood or snell may be quickly and easily connected with and as quickly and easily disconnected from a leader or line when desired, and one which will effectually prevent a casual disconnection and consequent loss of the snood or snell and the hook thereon.

With the foregoing end in view the invention will be fully understood from the following description and claims when taken in conjunction with the accompanying drawings, in which—

Figure 1 is a view illustrating a portion of a fishing-line equipped with one of my improved devices, the same being shown as connecting a snood or snell with the line. Fig. 2 is an enlarged detail view of the device, and Fig. 3 is a section taken through the eye of the device in the plane indicated by the line $x$ $x$ of Fig. 2.

Referring by letter to the said drawings, A indicates a fishing-line similar to those in general use.

B indicates a snood or snell which is also similar to those in general use and is provided with a hook C at one end and a loop or bight D at its opposite end, and E indicates my improved device for effecting the connection of the snood or snell to the line.

The device E may be made of any suitable material, although I prefer to form it of fine steel wire, as shown, and it comprises the shank $a$, which is designed to be lashed or otherwise permanently connected to the line A and the eye $b$ at one end of said shank. This eye $b$ is formed by coiling a portion of the piece of wire, as shown, and for the purpose of rendering it more resilient such portion of the piece of wire is preferably reduced in thickness, as illustrated.

When it is desired to secure the snood or snell B to my improved device E, it is simply necessary to pass the eye of the device through the bight or loop D of the snood and then draw said bight or loop between the shank $a$ and the contiguous portion of the coil forming the eye $b$ and work it around past the free end of the portion of wire forming the eye, when said bight or loop will be secured in the eye $b$ and will not be liable to be casually disengaged or disconnected therefrom. When, however, it is desired to disconnect the snood from the device, it is simply necessary to draw the end of the bight or loop of the snood down between the two whirls of the coil past the free end of the portion of wire forming the eye, when the said eye and the bight or loop will be separated. In this way it will be observed that a snood or snell may be quickly, easily, and securely connected to a line, and while there is no liability of the said snood being casually disconnected in use, yet it may be quickly and easily disconnected from the line when it is desired to replace it with a new snood or pack it in a fly-book. It will also be observed that in virtue of the construction of my improved device the connection and disconnection of the snood may be effected without in any way injuring the same, and it will further be observed that my improved devices are very small and compact and that they may be easily manufactured from a small piece of wire and may therefore be produced very cheaply.

I do not desire to be understood as confining myself to flattening the portion of the piece of wire which forms the eye $b$, although I prefer to do so for the reason stated. I also do not desire to be confined to making the eyes $b$ of the devices of circular or general circular form, as, when desired, they may be made oblong in order to enable those attached to lines to pass through the eyes on fishing-rods.

In virtue of my improved device an angler is enabled to make a very lifelike cast of a fly on the water, because the hook will hang loose and the tangling so often experienced will be prevented. Again, in virtue of the snood of a hook being attached to the eye $b$ side play is afforded from the end of the line, so that a fish once hooked can get no purchase, as on a continuous line, to "spit" out the hook.

Having described my invention, what I claim is—

As an improved article of manufacture the device described formed from a single piece of wire and comprising the shank adapted to be connected to a leader or line and the portion at one end of the shank reduced in thickness and coiled so as to form an eye, substantially as and for the purpose set forth.

In testimony whereof I affix my signature in presence of two witnesses.

LEONARD HARLE McMAHON.

Witnesses:
GEO. A. PEEBLES,
HELEN E. GRIFFITH.